United States Patent
Paek et al.

(10) Patent No.: US 6,600,863 B2
(45) Date of Patent: Jul. 29, 2003

(54) METHOD FOR FABRICATING ALLOY-COATED OPTICAL FIBER

(75) Inventors: Un-Chul Paek, Kwangju-kwangyeok-shi (KR); Dong-Soo Park, Daegu-kwangyeok-shi (KR); Yong-Kong Seo, Kwangju-kwangyeok-shi (KR); Jin-Han Kim, Kumi-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/782,853

(22) Filed: Feb. 14, 2001

(65) Prior Publication Data

US 2001/0048800 A1 Dec. 6, 2001

(30) Foreign Application Priority Data

May 12, 2000 (KR) ........................................ 2000-25322

(51) Int. Cl.⁷ ................................................ G02B 6/22
(52) U.S. Cl. ........................ 385/128; 427/163.2; 65/431
(58) Field of Search ............................ 65/431; 385/123, 385/126, 127, 128; 427/163.2

(56) References Cited

U.S. PATENT DOCUMENTS

| | | | | |
|---|---|---|---|---|
| 4,407,561 A | * | 10/1983 | Wysocki | 359/900 |
| 4,712,866 A | * | 12/1987 | Dyott | 385/126 |
| 4,788,406 A | * | 11/1988 | Holman et al. | 385/128 |
| 5,100,449 A | * | 3/1992 | Cornelius et al. | 65/2 |
| 5,157,753 A | * | 10/1992 | Rogers, Jr. | 385/115 |
| 6,173,102 B1 | * | 1/2001 | Suzuki et al. | 385/128 |

* cited by examiner

*Primary Examiner*—Michael C. Zarroli
(74) *Attorney, Agent, or Firm*—Cha & Reiter (57) ABSTRACT

An alloy-coated optical fiber and a fabricating method. In the alloy-coated optical fiber, a core is formed of a light transmitting material, a clad surrounds the outer circumferential surface of the core, and an indium-tin-silver coating layer is formed around the outer circumferential surface of the clad while maintaining the alloy temperature at substantially 5° C. above the melting point of this indium-silver alloy coat.

7 Claims, 9 Drawing Sheets

METHOD FOR FABRICATING ALLOY-COATED OPTICAL FIBER

CLAIM OF PRIORITY

This application makes reference to, incorporates the same herein, and claims all benefits accruing under 35 U.S.C. Section 119 from an application for "ALLOY-COATED OPTICAL FIBER AND FABRICATING METHOD THEREOF," filed earlier in the Korean Industrial Property Office on May 12, 2000 and there duly assigned Ser. No. 2000-25322.

BACKGROUND OF THE INVENTION

1. Field of the Invention

The present invention relates generally to an optical fiber, and more particularly to an optical fiber with the cladding layer coated with alloy materials on its outer circumferential surface and a fabricating method thereof.

2. Description of the Related Art

Basically, optical fiber coating methods are classified into a polymer coating, a metal coating, and a mineral coating. In particular, the metal coating provides better sealing capabilities due to its feasibility during soldering and welding; thus, it is widely used for undersea cables. Moreover, the metal coating is stronger and better heat-proof when compared to other coating methods, and accordingly, it is more suitable to be used in many unfavorable circumstances. Some of the known materials used in the metal coating includes tin (Sn), aluminum (Al), zinc (Zn), indium (In), lead (Pb), gold (Au), and nickel (Ni).

Figure 1:
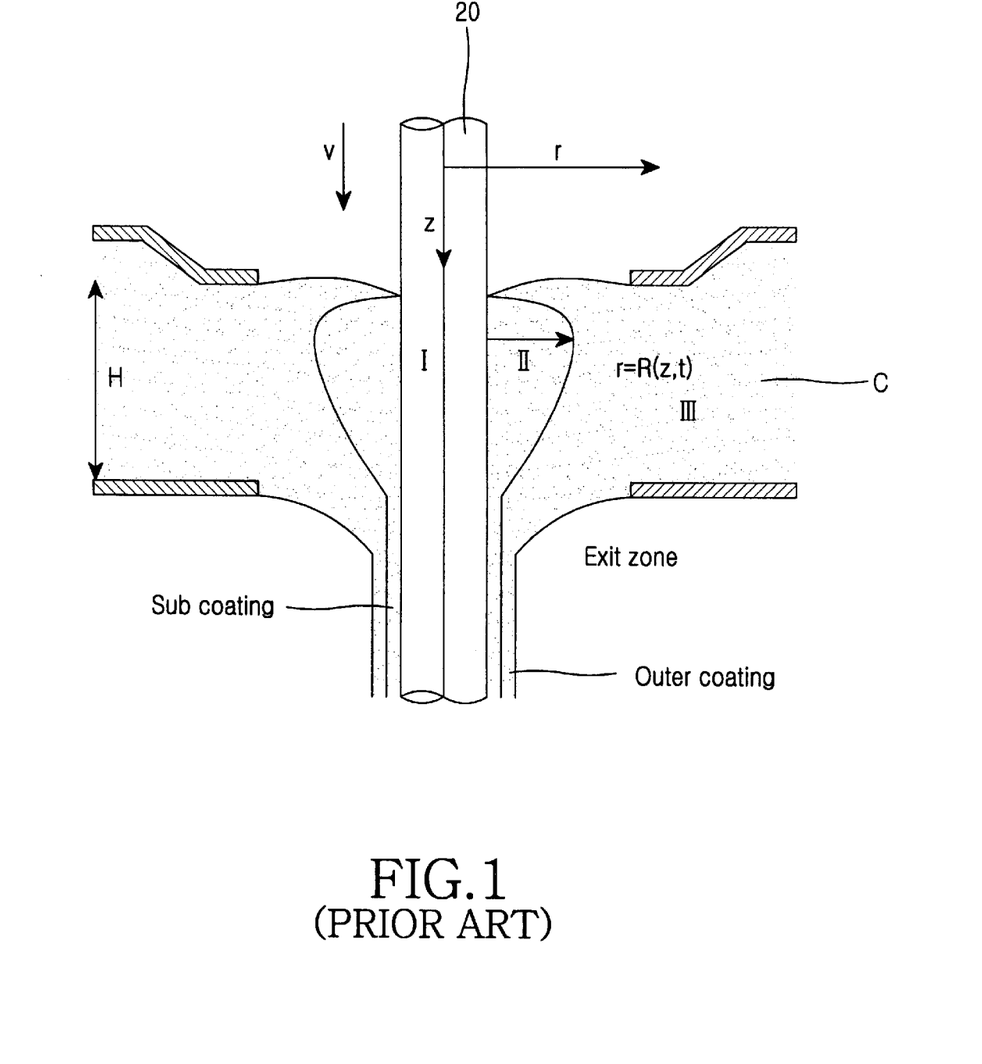
FIG. 1 is a schematic view of a general optical fiber illustrating the metal coating principle.

FIG. 1 is a schematic view of a general optical fiber illustrating the metal coating principle. In FIG. 1, the regions I, II, and III represent an optical fiber, a frozen metal, and a melted metal, respectively. Reference characters V, r, z, H, and C, respectively, denote the optical fiber drawing speed, the distance from the center of the optical fiber, the distance along the optical fiber, the height from the bottom of a coater, and the melted metal for coating material.

As shown in FIG. 1, the thermal effect caused by the difference in the temperature between the optical fiber and the metal solution enables the metal solution to be coated on the outer circumferential surface of the optical fiber. The temperature of an optical fiber is at the room temperature, whereas the melted metal is at a relatively high temperature, for example, 200° C. When the fiber is exposed to the metal solution with a vast difference in the temperature, the metal becomes instantaneously adhesive around the outer circumferential surface of the optical fiber.

Referring to FIG. 1, the mechanism of the metal coating is divided into a subcoating and an outercoating. The adhesive effect caused by the temperature differences is responsible for the subcoating, and the coating at the exit zone of the coater provides the outercoating. The relationship between the subcoating and the outercoating is expressed as:

$$h_o = 0.64b\left(\frac{3\eta V}{\sigma}\right)^{2/3}, \quad (1)$$

where $h_0$ is the thickness of the outercoating, b is the thickness of the subcoating, $\eta$ is viscosity, $\sigma$ is surface tension, and V is an optical fiber drawing speed.

The principle and method of coating an optical fiber with metal materials are disclosed in R. G. C. Arridge, A. A. Baker, and D. Cratchley, "Metal Coated Fibers and Fiber Reinforced Metals", J. Sci. Insts., vol. 41, p. 447, 1967. The paper discloses a dip method that is used in the metal coating process and explores some of the coating principle of an optical fiber, including the "freezing effect" which describes the adhesive characteristics of the fiber and the coating materials.

In the paper, "Reductions in Static Fatigue of Silica Fibers by Hermetic Jacketting", Appl. Phys. Lett., vol. 34, p. 17, 1979.D.—written by A. Pinnow, G. D. Robertson, and J. A. Wysocki, explains the properties relating to the life of an optical fiber and how they are mainly limited by the static fatigue and that an aluminum-coated optical fiber lasts five times longer than a conventional polymer-coated optical fiber.

In another paper written by V. V. Bogatryrjov, E. M. Dianov, S. D. Rumyantesev, A. Y. Makerenko, S. L. Semenov, and A. A. Sysoljatin in "Super High Strength Hermetically Metal Coated Optical Fibers", SOV. Lightwave Commun., Vol. 3, P235, 1993, showed that an optical fiber fabricated by blocking the introduction of air as soon as the optical fiber is drawn from a preform and injecting nitrogen into the optical fiber exhibits a theoretical strength, approximately, about 14 Gpa.

In the conventional method of coating, a single metal, i.e., aluminum, has been typically used as coating material for an optical fiber. However, due to the limitations of physical characteristics in the single metal, it is not possible to control the properties of single metal materials to provide different performance as required in varying environment and communications applications.

SUMMARY OF THE INVENTION

It is, therefore, an object of the present invention to provide an alloy-coated optical fiber in which the coating performance is controllable according to its applications, and a method of fabricating the optical fiber.

It is another object of the present invention to provide an alloy-coated optical fiber with a higher bending strength without the phase separation, and a method of fabricating the optical fiber.

According to one aspect of the present invention, the core is formed of a light transmitting material, the cladding surrounds the outer circumferential surface of the core, and an indium-tin-silver coating layer is formed around the outer circumferential surface of the cladding.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. For the purpose of clarity, well-known functions or constructions are not described in detail as they would obscure the invention in unnecessary detail.

Figure 2:
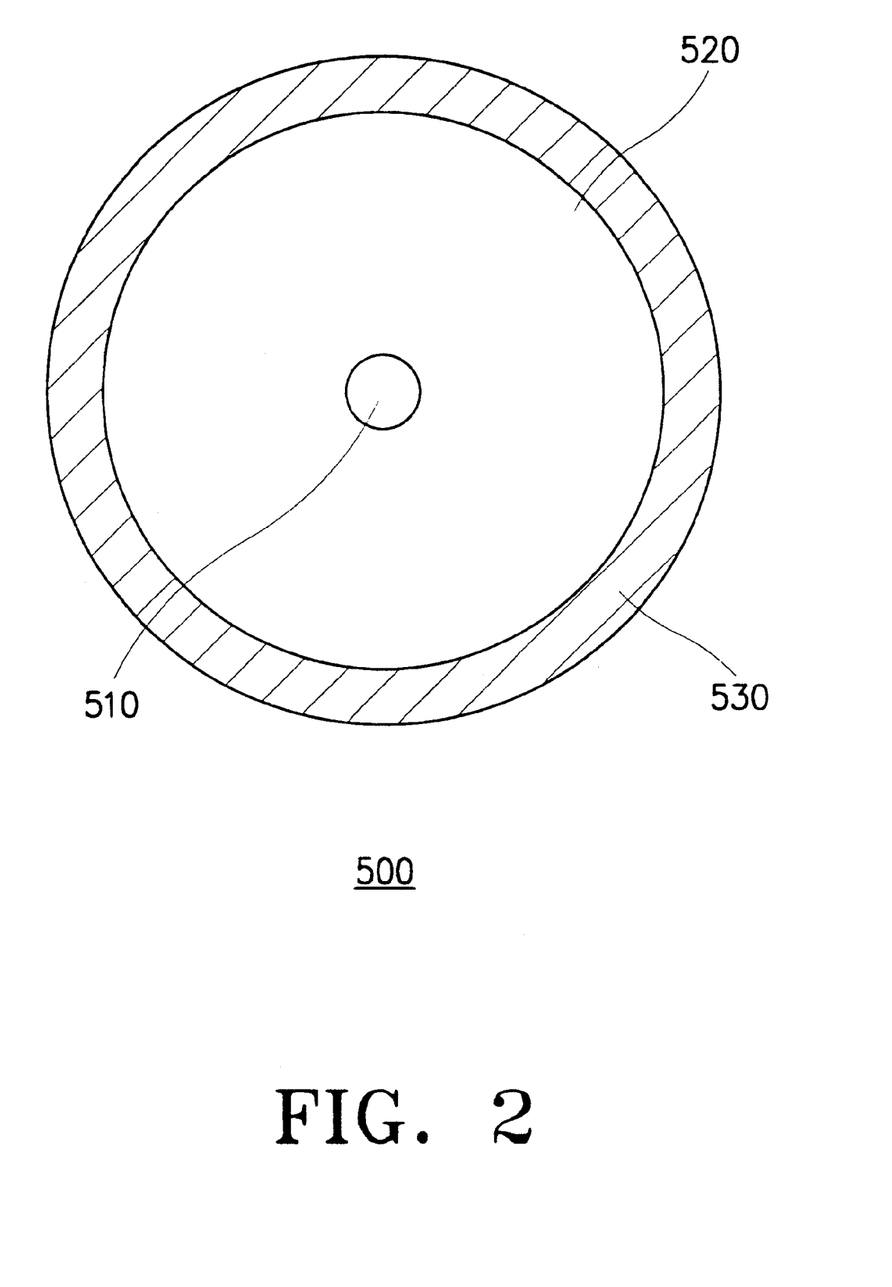
FIG. 2 is a schematic view of an alloy-coated optical fiber according to the preferred embodiment of the present invention.

FIG. 2 is a schematic view of an alloy-coated optical fiber according to the preferred embodiment of the present invention. In FIG. 2, an alloy-coated optical fiber 500 is comprised of a core 510 which acts as a light transmission medium, a cladding 520 around the outer circumferential surface of the core 510, and an indium-tin-silver coating layer 530 around the outer circumferential surface of the clad 520. Here, the composition of the coating layer 530 is 78% Sn, 20% In, and 2% Ag.

The alloy coating layer 530 protects the optical fiber from the exposure to high temperature or high humidity in a diverse environment, for example, under the sea or high humidity and very warm locations. The alloy coating layer 530 also provides the bending strength to the optical fiber so that the optical fiber is not damaged from the excess bending. The composition and thickness of the alloy coating layer 530 are determined by the mixing ratio of the melted alloy as well as the length of the optical fiber in contact with the melted alloy during the coating process.

Figure 3:
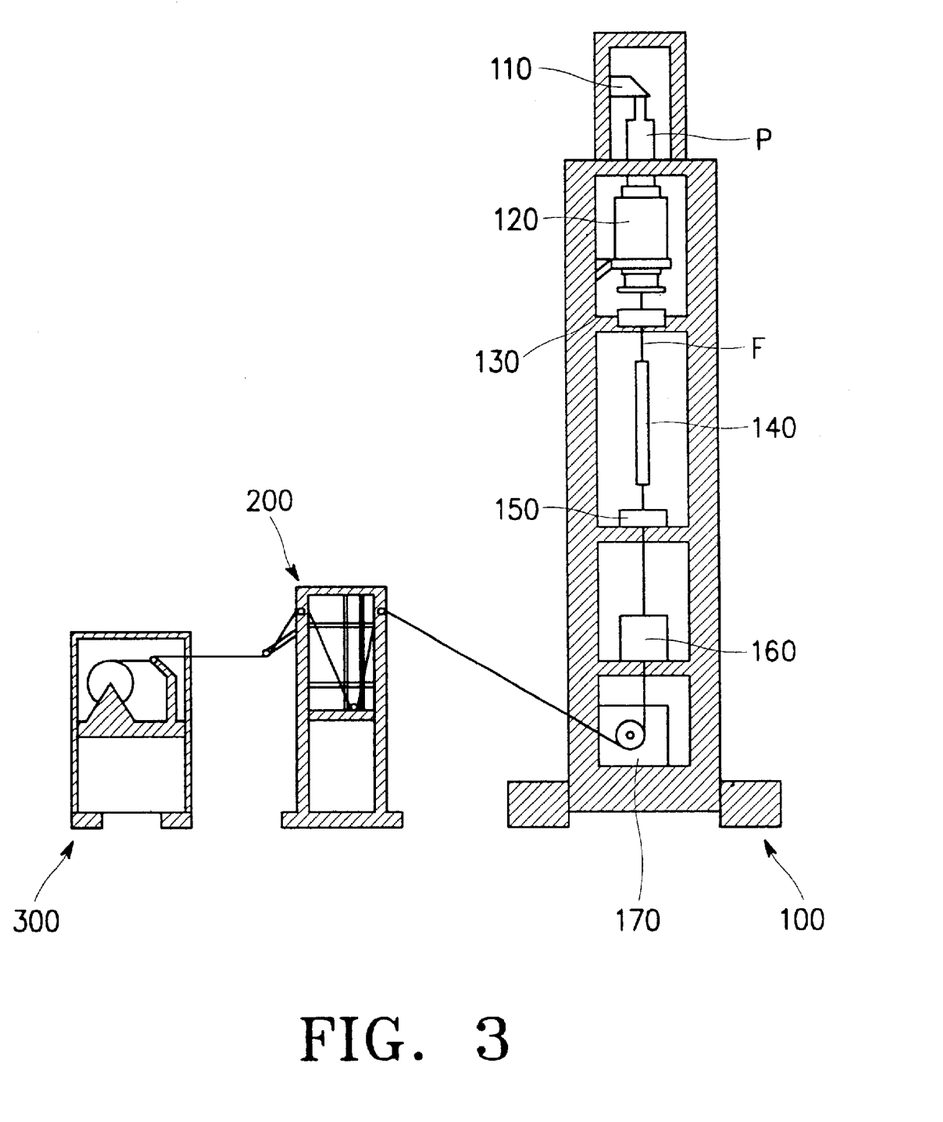
FIG. 3 is a schematic view of an optical drawing device according to the preferred embodiment of the present invention.
Figure 4:
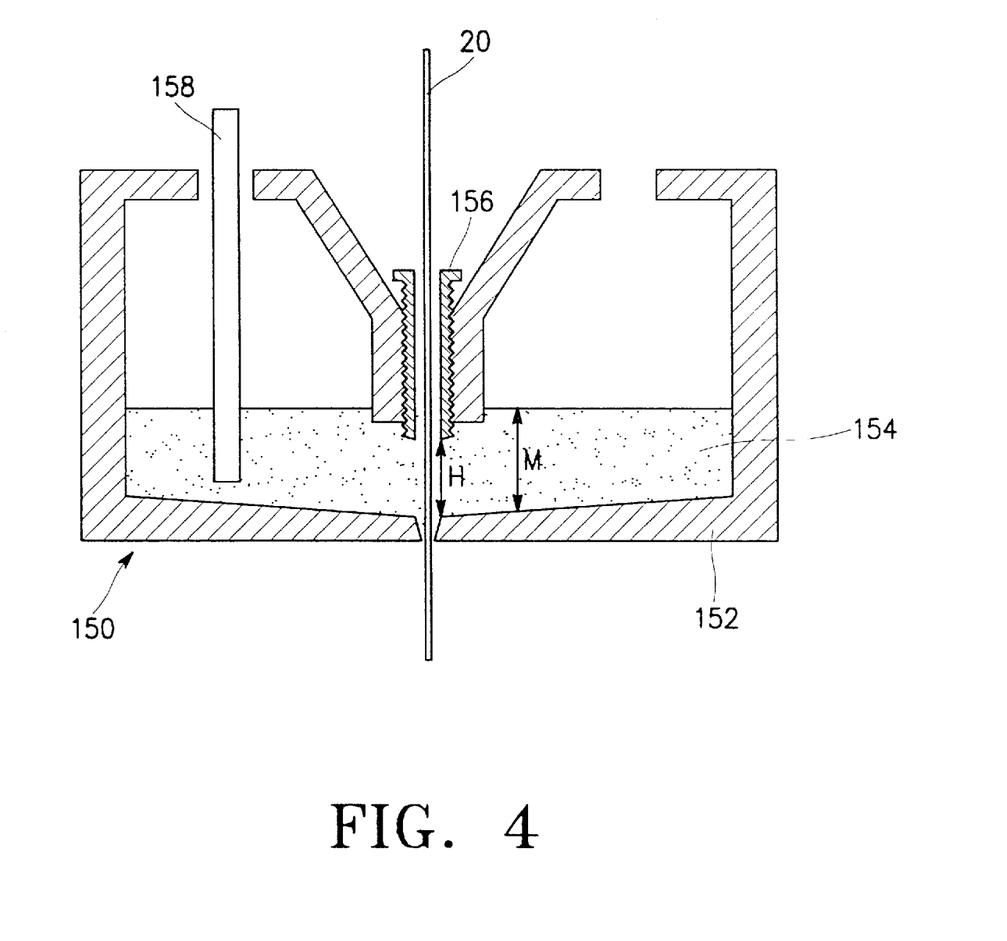
FIG. 4 is a sectional schematic view of an optical fiber coater according to the preferred embodiment of the present invention.

FIG. 3 schematically illustrates an optical fiber drawing device according to the preferred embodiment of the present invention, and FIG. 4 is a cross-sectional view of an optical fiber coater according to the preferred embodiment of the present invention.

In accordance with the preferred embodiment of the present invention, an alloy-coated optical fiber fabricating method includes three major steps of melting the alloy materials, supplying the melted alloy, and coating of the melted alloy.

In first step, an alloy in a melted state is formed by mixing composition of indium, tin, and silver. The temperature of the melted alloy is controlled by a temperature controller with heater.

In second step, the melted alloy is filled into an optical fiber coater 150 shown in FIG. 3. The coater is required to have capacity adequate enough to maintain the storage height of the melted alloy constant for the uniform alloy coating. If the storage height of the melted alloy is too low, the coating becomes non-uniform along the length of the optical fiber. If the storage height is too high, the coating will fail because too much of melted alloy will be applied along the fiber and will drip drown without being coated along the fiber. Hence, the storage height of the melted alloy should be appropriately controlled so that an optimal amount of melted alloy is coated along the fiber.

In third step, the indium-tin-silver alloy is coated on the outer circumferential surface of an optical fiber F when the optical fiber F is passed through the optical fiber coater 150 in the optical fiber drawing device 100, as shown in FIGS. 3 and 4. Accordingly, the parameters that affect the optimal coating of melted alloy includes the optical fiber alignment, the optical fiber drawing speed, the temperature inside the coater, and the amount of contact length between the optical fiber F and the melted alloy.

Regarding optical fiber alignment, the optical fiber should pass through the coater 150 while being positioned at the center of the coater. Thus, the coater 150 coating is positioned so that the outer coating layer is off-centered relative to the fiber being drawn therefrom. Possible misalignment of the optical fiber results in an oval or distorted circular cross-section of the optical fiber, thereby reducing the strength of the optical fiber. Meanwhile, the optical fiber drawing speed is related with the thickness of the fiber coating. As the optical fiber drawing speed increases up to a threshold speed, the coating thickness increases to a particular level. Yet, if the drawing speed exceeds the threshold, the coating thickness decreases.

In addition, the coater temperature is related with coating quality. If the coating is executed at too high temperature, it increases the probability of re-melting the metal coated along the optical fiber. Thus, it is preferable to control the coater temperature to be 5° C. higher than the melting point of the alloy. Furthermore, the contact length that is provided in the coating device between the optical fiber and the melted alloy affects the coating thickness. The contact length can be controlled by rotating a control screw inside the coater (described later). Accordingly, if the optical fiber contacts the melted alloy along a long length, the coated alloy is melted as the temperature of the melted alloy is higher than the solid alloy.

It should be noted that the alloy coating step can be implemented by utilizing magnetron sputtering, ion plasma deposition, and chemical vapor deposition (CVD), as well as the dip method according to the embodiment of the present invention.

Referring to FIG. 3, the optical fiber drawing device 100 includes a preform support 110 for holding an optical fiber preform P; a heater 120 for melting the preform P from which the optical fiber is drawn; a diameter measurer 130 for measuring the diameter of the optical fiber F drawn from the heater 120; a cooling tube 140 for cooling the optical fiber F; a coater 150 for coating the outer circumferential surface of the optical fiber F; a drawing tension measurer 160 for measuring the tension applied during the drawing of the optical fiber F; a capstan 170 for providing the drawing tension to the optical fiber F; an accumulator 200 for adjusting the drawing tension of the capstan 170; and, a winder 300 for winding the final optical fiber around a spool.

Referring to FIG. 4, the coater 150 includes a coater frame 152 for containing the melted alloy 154 by a height M, a control screw 156 for controlling the contact length H of an optical fiber 20 with the melted alloy 154, and a temperature sensor 158 for sensing the temperature of the coating materials so that a constant temperature can be maintained.

Figure 5A:
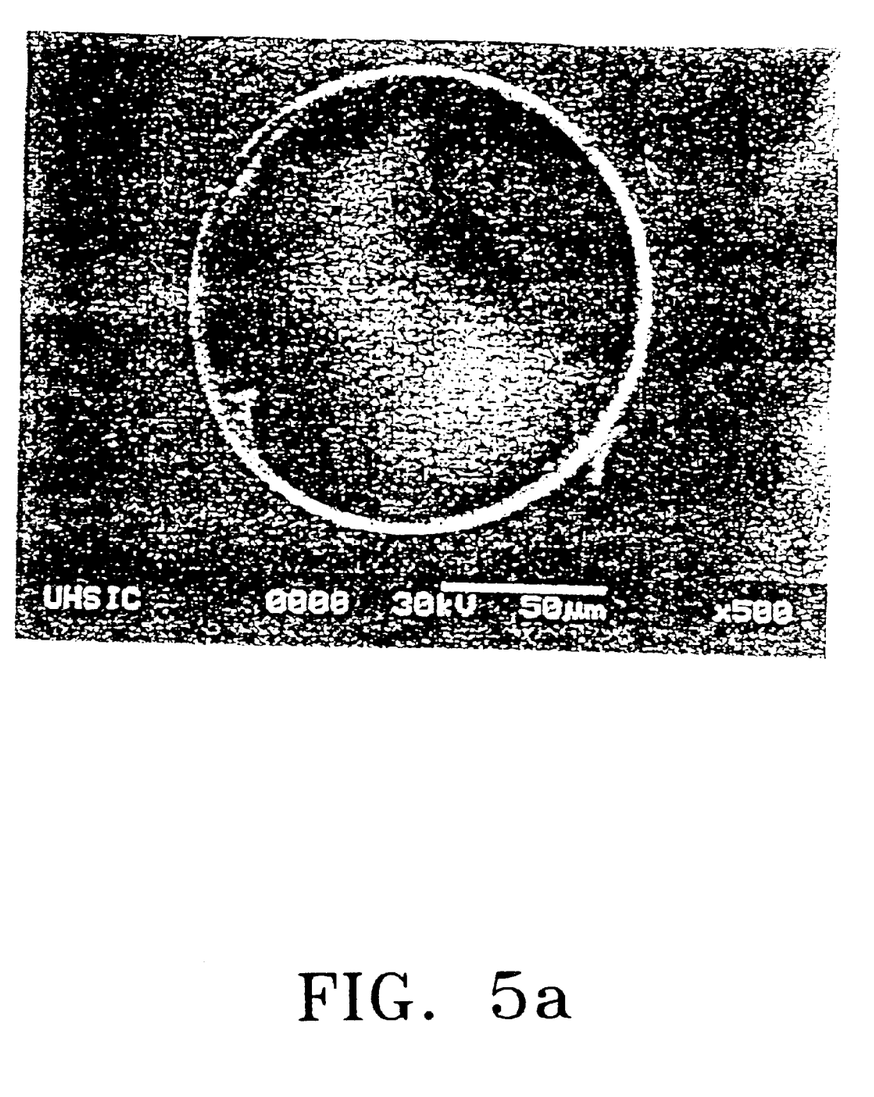
FIG. 5A is a SEM (Scanning Electron Microscope) photo showing the cross-section of an indium-tin-silver coated optical fiber according to the preferred embodiment of the present invention.
Figure 5B:
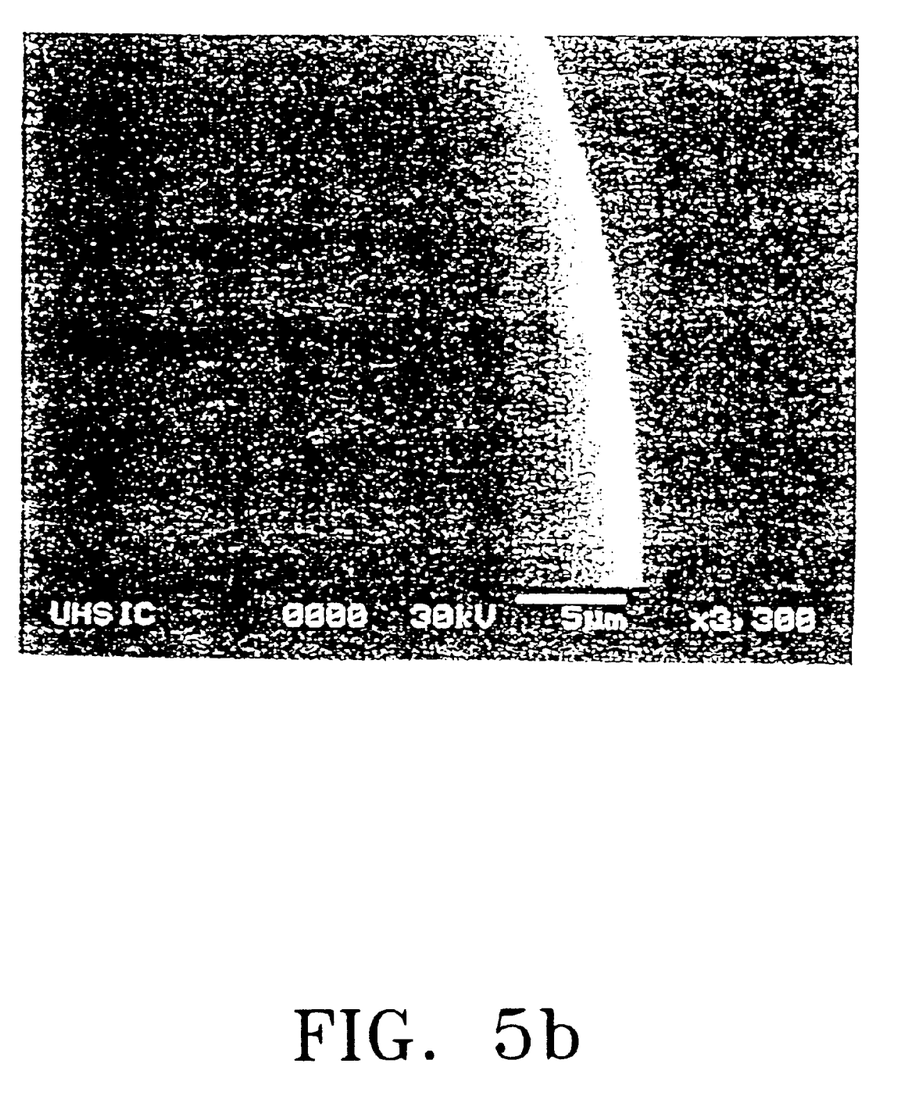
FIG. 5B is a SEM photo showing the thickness of the indium-tin-silver coated optical fiber according to the preferred embodiment of the present invention.

FIG. 5A is an SEM photo showing the cross-section of an indium-tin-silver coated optical fiber according to the preferred embodiment of the present invention, and FIG. 5B is an SEM photo showing the thickness of the indium-tin-silver coated optical fiber according to the preferred embodiment of the present invention.

As shown in FIGS. 5A and 5B, the indium-tin-silver alloy coating layer formed according to the embodiment of the present invention covers the outer circumferential surface of the optical fiber with a uniform thickness without any tilt. It is observed that the alloy coating layer is about 5 μm. The alloy-coated optical fiber was drawn at 30 m/min.

Figure 6:
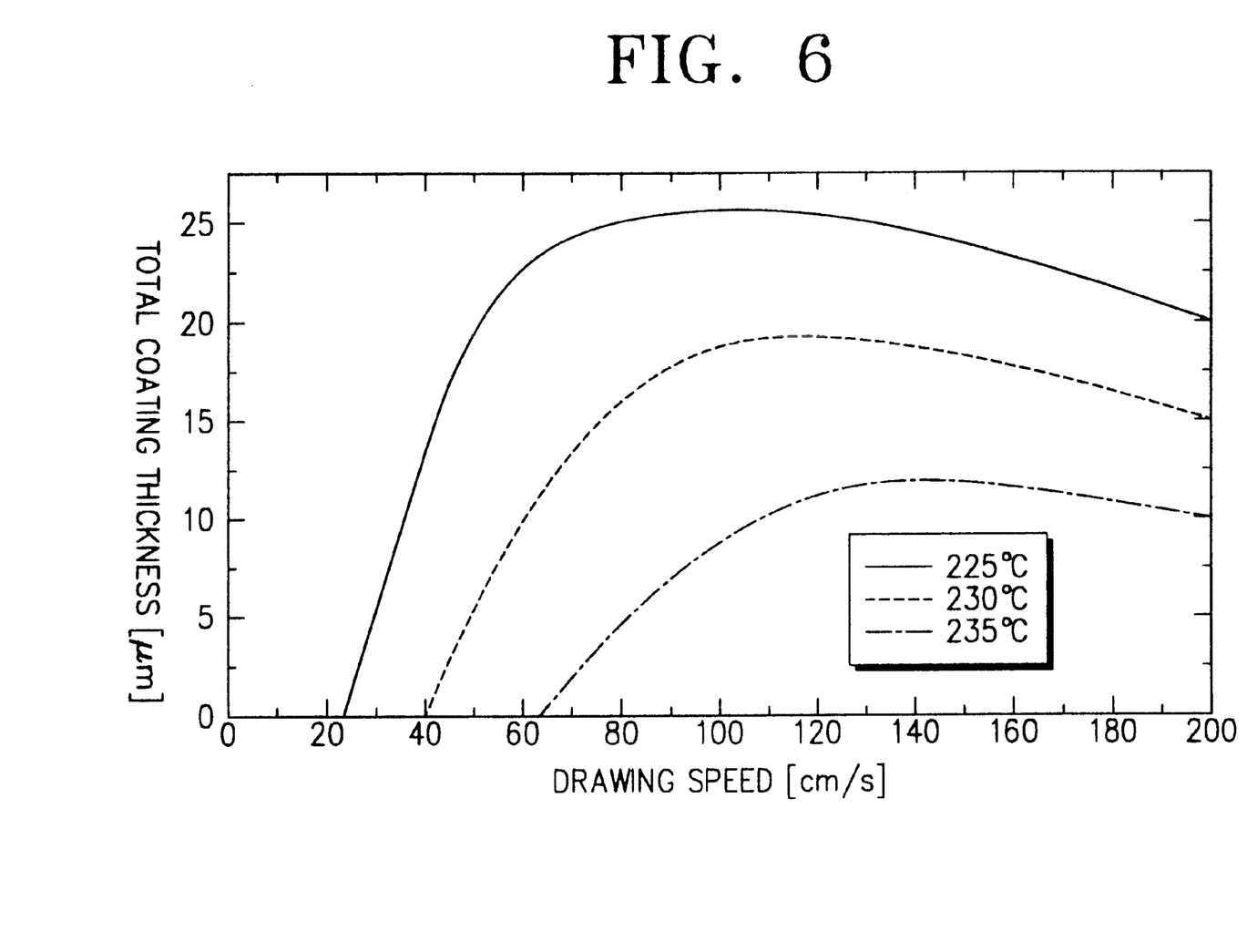
FIG. 6 is a graph showing variations in the total coating thickness with respect to an optical fiber drawing speed and the change of temperature in the optical fiber coater.
Figure 7:
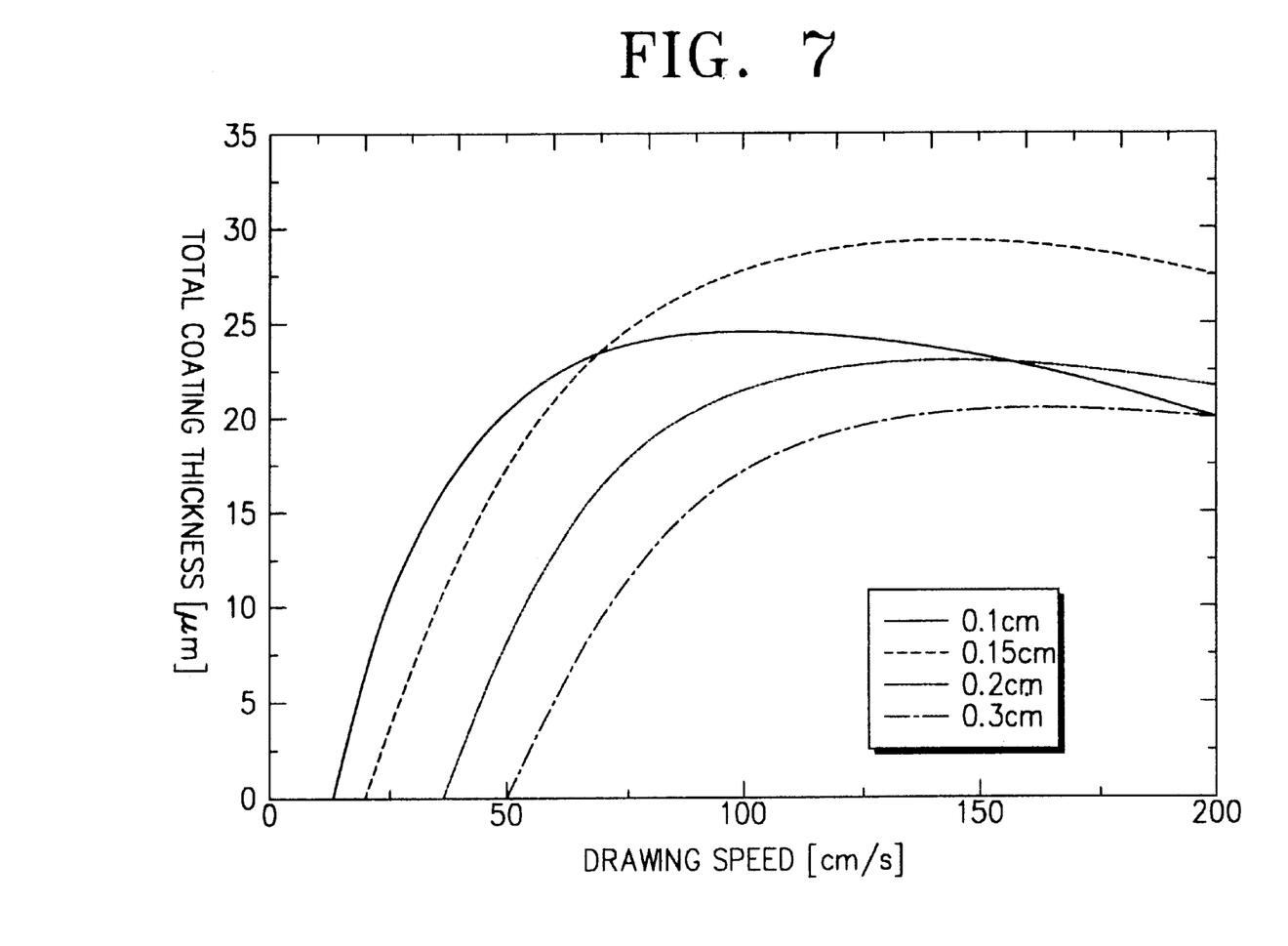
FIG. 7 is a graph showing variations in the total coating thickness with respect to the optical fiber drawing speed and the change of the contact length of the optical fiber coater; and, FIG. 8 is a graph showing a comparison in the bending strength between the polymer-coated optical fiber and the alloy-coated optical fiber according to the preferred embodiment of the present invention.

FIG. 6 is a graph showing variations in the total coating thickness with respect to an optical fiber drawing speed and the temperature in the optical fiber coater, and FIG. 7 is a graph showing the variations in the total coating thickness with respect to the optical fiber drawing speed and the change in the contact length of the optical fiber coater. Here, the total coating thickness is the sum of subcoating thickness and outercoating thickness.

Referring to FIGS. 6 and 7, if the other variables are constant, the coating thickness is determined by the optical fiber drawing speed, the coater temperature, and the contact length of an optical fiber with the melted alloy. For example, if the optical fiber drawing speed is 80 cm/s as shown in FIG. 6 and the coater temperature increases from 225° C. to 230° C. and then 235° C., the coating thickness decreases from 24 μm to 15 μm and then 5 μm. If the optical fiber drawing speed is 100 cm/s, the coating thickness varies to 25, 28, 22, and 27.5 μm with respect to the variations of the contact length to 0.1, 0.15, 0.2, and 0.3 cm, as shown in FIG. 7.

Figure 8:
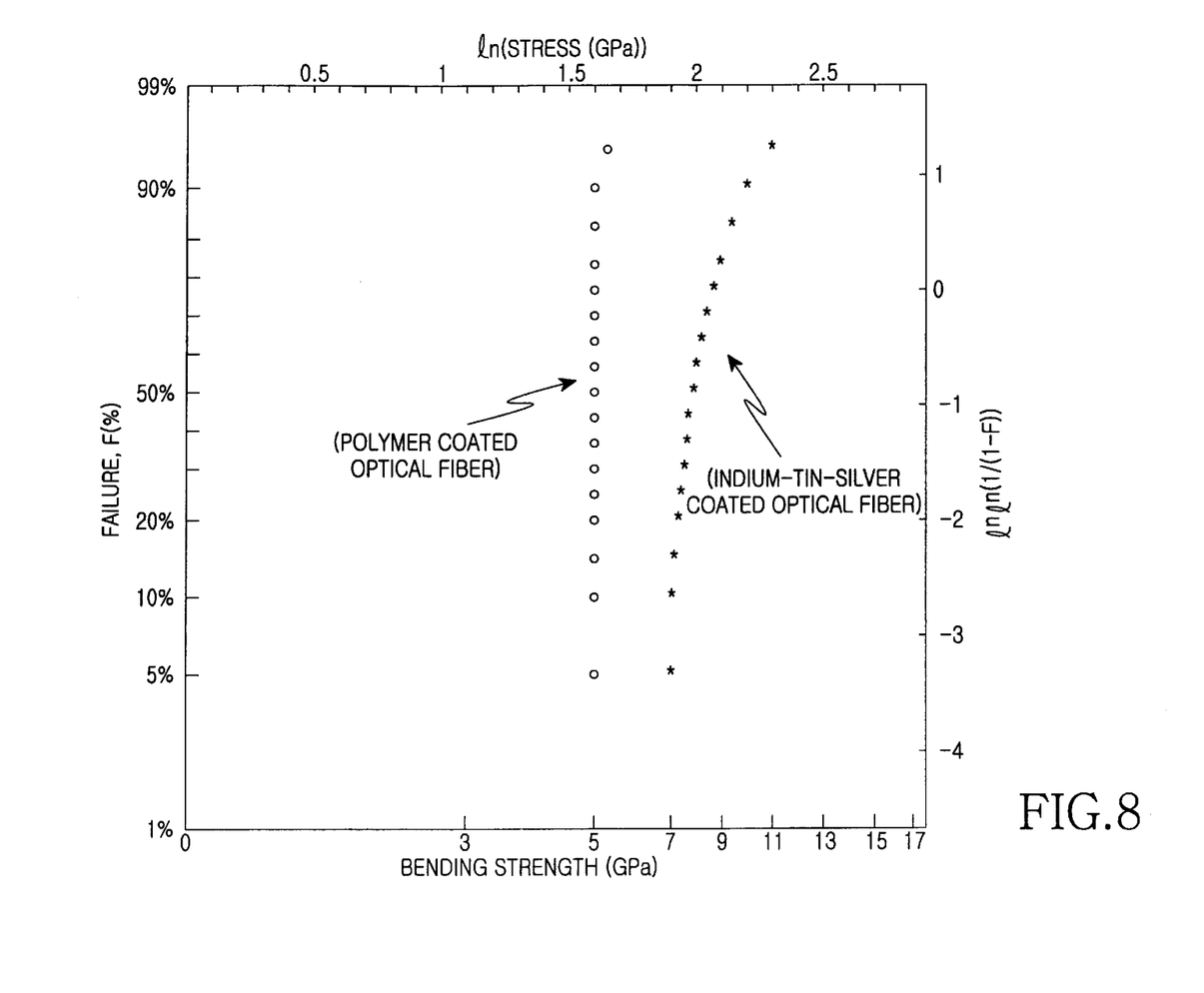

FIG. 8 is a graph showing the comparison in bending strength between the polymer-coated optical fiber of the prior art system and the alloy-coated optical fiber according to the preferred embodiment of the present invention. The bending strength of each optical fiber was measured in a two-point bending technique and represented in Weibull plots. Reference symbol "o" denotes the bending strength of the polymer-coated optical fiber, and reference symbol "*" denotes the bending strength of the indium-tin-silver coated optical fiber.

In FIG. 8, the polymer-coated optical fiber has a maximum bending strength of 5.5Gpa, whereas the alloy-coated optical fiber has a maximum bending strength of 10Gpa. Therefore, the alloy-coated optical fiber according to the present invention is twice higher that the polymer-coated optical finer in terms of the bending strength.

As described above, the present invention uses an indium-tin-silver alloy that is composition-controllable as an optical fiber coating material. Therefore, the alloy-coated optical fiber is suitable for its application environment and has high bending strength.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. A method for coating an optical fiber having a core and a surrounding cladding, comprising the steps of:

(a) preparing an alloy liquid coating composition by mixing indium, tin, and silver;

(b) filling said alloy coating composition into a coating container; and, (c) drawing said fiber through said coating container such that said fiber is surrounded by an outer coating layer formed from said alloy coating composition, wherein the temperature of said coating container is maintained at substantially 5° C. higher than the melting point of said alloy coating composition.

2. The method of claim 1, wherein said outer coating layer forms a solid protective layer around the circumferential surface of said optical fiber.

3. The method of claim 1, wherein said outer coating layer has an uniform coating thickness.

4. The method of claim 1, wherein the speed of said drawing is so controlled such that the thickness of said outer coating layer is kept constant.

5. The method of claim 1, wherein the speed of said drawing of said fiber is maintained at a predetermined rate.

6. The method of claim 1, wherein a longitudinal contact area of said fiber exposed to said alloy coating composition is selectively controlled so that outer coating layer has a uniform coating thickness.

7. The method of claim 1, wherein said coating container is positioned so that said outer coating layer is off-centered relative to said optical fiber with said core and said cladding.

* * * * *